United States Patent Office 2,890,212
Patented June 9, 1959

2,890,212

POLYMERIZATION OF OLEFINS WITH COPPER ACETYLIDE, SILVER ACETYLIDE OR MERCURY ACETYLIDE CATALYST

Peter B. Murray, Swarthmore, Pa., assignor to Sun Oil Company, Philadelphia, Pa., a corporation of New Jersey No Drawing. Application February 27, 1957
Serial No. 642,682

10 Claims. (Cl. 260—93.7)

This invention relates to a process for the polymerization of normally gaseous olefins and particularly relates to a process for the preparation of solid polymers of ethylene, solid polymers of propylene, and solid copolymers of ethylene and propylene.

Processes using solid catalytic materials for the preparation of polyethylene and polypropylene, by which is meant the polymers of ethylene and propylene which are solid at room temperature, have heretofore been described. Such processes generally involve contacting a normally gaseous olefin, usually dissolved in a solvent, with the solid catalyst under polymerizing conditions. Batch or continuous operation may be used. In such processes, polymers of widely varying molecular weights are produced so that subsequent treatment, such as separation according to molecular weight, is necessary to make the product suitable for specific applications. Also, a portion of the polymer deposits on and deactivates the catalyst. This deposition hinders the production of significant yields of polymer and makes catalyst regeneration necessary. Catalyst regeneration is difficult and usually requires intensive solvent treatment, and even with such treatment, complete success in regenerating the catalyst and in recovering, as useful products, the deposited resinous polymer are not achieved. The use of other catalysts, such as benzoyl peroxide, has also been described, but such catalysts generally require the use of very high pressures so that operation is difficult and expensive apparatus necessary.

An object of the present invention is to provide a process for the preparation of solid polymers of ethylene. A further object is to provide a process for the preparation of solid polymers of propylene. Another object is to provide a process for the preparation of solid polymers of a normally gaseous olefin having relatively uniform molecular weights. A further object is to provide a process for the preparation of polyethylene which does not require high pressures and in which separation of polymer from solid catalyst is not necessary. Other objects and their achievement in accordance with the process of the invention will be apparent hereinafter.

It has now been found that by contacting a small quantity of silver acetylide, copper acetylide or mercury acetylide with a normally gaseous olefin at a temperature above the decomposition temperature of the acetylide employed, a rapid reaction is made to occur in which the olefin is converted to solid polymers thereof.

In an embodiment of the process, ethylene is dissolved in a solvent therefor, such as isooctane. A small amount of copper acetylide is incorporated in the solution held at a temperature below the decomposition temperature of the acetylide. The acetylide may be dissolved, dispersed or both dissolved and dispersed, in the ethylene solvent. The mixture is then heated to the decomposition temperature of the copper acetylide. A rapid reaction occurs causing the polymerization of ethylene to polyethylene.

Copper, silver and mercury derivatives of acetylene, herein designated coopper acetylide, silver acetylide and mercury acetylide, respectively, are known to the art. When in the dry state, these compounds are known to be explosive and sensitive to shock, and hence due caution must be exercised in their incorporation of the reaction mixtures of the invention. Copper acetylide is preferred since it is less sensitive to shock and hence is more convenient to use. Silver acetylide, however, can be used with good results. Silver acetylide is relatively stable when slightly moist, and can be used with good results when in this state.

A quantity of the acetylide sufficient to induce polymerization should be employed. This quantity generally will be in the range of from about 0.001 to 1 percent by weight based on the quantity of olefin present. A larger amount does not appear to improve the process. The quantity of acetylide used is a convenient means for regulating the molecular weight of the polymer obtained. With relatively small quantities of acetylide, within the lower portion of the defined range, the molecular weight of the polymer product is relatively high, say above about 80,000. When relatively large amounts of the acetylide is used, say a quantity in the upper portion of the defined range, the molecular weight of the resulting polymer is relatively low, such as below about 20,000.

It is preferred to employ aliphatic hydrocarbons as solvents for the normally gaseous olefin used in the reaction. Isooctane gives good results and is preferred. Other hydrocarbons, such as butanes, pentanes, hexanes, heptanes, decanes, mixtures thereof and the like can be used with good results. Aromatic hydrocarbons such as benzene, toluene, xylene, ethylbenzene, mixtures thereof and the like can also be employed with good results.

It is preferred to operate the process under somewhat elevated pressures, say from about 10 to 1000 p.s.i.g. Substantial quantities of ethylene, propylene or mixtures thereof are dissolved in the defined solvents under these pressure conditions. When operating the process, it is preferred to introduce the acetylide into the solvent, followed by the addition of the olefin to the desired pressure. The reaction mixture is then heated to the decomposition point of the acetylide. At this temperature the reaction proceeds rapidly to completion. Mechanical agitation of the reaction mixture during polymerization aids in achieving a polymer product of uniform molecular weight. The quantity of decomposition products of the acetylide used is not appreciable and special steps for the separation thereof from the polymer is not necessary.

Continuous operation can advantageously be employed in operating the process of the invention. A preferred means for conducting the process as a continuous operation is to continuously inject a stream of an acetylide dissolved or dispersed in a solvent, which stream is maintained at a temperature below the decomposition temperature of the acetylide, into a continuously flowing stream of ethylene or propylene in a solvent, this latter stream being maintained at an elevated temperature sufficient to raise the temperature of the admixed streams to the decomposition temperature of the acetylide. On injection of the acetylide into the olefin-containing stream in this manner, a rapid reaction is initiated whereby polymers of the olefin are formed.

Although the process of the invention is primarily directed to the polymerization of ethylene, propylene, or mixtures of ethylene and propylene, other olefins such as butene-1, isobutene, and the like can be present in amounts up to about 25% by weight of the ethylene, and enter into the polymerization reaction with good results.

To illustrate a specific embodiment of the process of the invention, 100 parts by weight of isooctane is introduced into a reactor. 0.01 part by weight of copper acetylide is then introduced into the isooctane. Ethylene is introduced into the reactor to a pressure of about 500 p.s.i.g. (pounds per square inch gauge). The reaction mixture is then heated to an elevated temperature to cause decomposition of the acetylide. A rapid reaction occurs wherein polyethylene is formed. This reaction is evidenced by sharp reduction in pressure within the reaction vessel. The reaction mixture containing polyethylene in suspensions is removed from the reactor and the polyethylene separated by decanting. A solvent is removed by evaporation, the resulting polyethylene is a white, fluffy solid having a density at 20° C. of about 0.92.

When silver acetylide or mercury acetylide is substituted for copper acetylide within the reaction conditions herein described, and/or when propylene is substituted for ethylene, substantially equivalent results are obtained in that solid polymers are formed.

Polyethylene, polypropylene, and copolymers of ethylene and propylene, prepared by the process of the invention are useful for preparing pipes for liquid transportation, containeres for corrosive liquids, thin films for wrapping food products, and the like. Such articles can be prepared by extrusion, molding, or other fabricating processes.

This application is a continuation-in-part of U.S. Serial No. 581,829, filed May 1, 1956, now abandoned.

The invention claimed is:

1. Process for preparing solid polymers of a normally gaseous olefin which comprises contacting ethylene in liquid phase with a catalyst consisting of a material selected from the group consisting of copper acetylide, silver acetylide and mercury acetylide at a temperature sufficient to decompose the selected acetylide.

2. Process for preparing solid polymers of ethylene which comprises contacting, in a hydrocarbon solvent, ethylene and a catalyst consisting of a metal acetylide selected from the group consisting of copper acetylide, silver acetylide and mercury acetylide and heating the resulting mixture to a temperature above the decomposition temperature of the selected acetylide.

3. Process according to claim 2 wherein the metal acetylide is copper acetylide.

4. Process according to claim 2 wherein the metal acetylide is silver acetylide.

5. Process according to claim 2 wherein the metal acetylide is mercury acetylide.

6. Process for preparing solid polymers of propylene which comprises contacting, in a hydrocarbon solvent, propylene and a catalyst consisting of a metal acetylide selected from the group consisting of copper acetylide, mercury acetylide and silver acetylide, and heating the resulting mixture to a temperature above the decomposition temperature of the selected acetylide.

7. Process according to claim 6 wherein the metal acetylide is copper acetylide.

8. Process according to claim 6 wherein the metal acetylide is silver acetylide.

9. Process according to claim 6 wherein the metal acetylide is mercury acetylide.

10. Process for preparing solid polymers of olefins which comprises contacting an olefin selected from the group consisting of ethylene, propylene, and mixtures of ethylene and propylene with a catalyst consisting of a material selected from the group consisting of copper acetylide, silver acetylide, and mercury acetylide at a temperature sufficient to decompose the selected acetylide.

References Cited in the file of this patent

UNITED STATES PATENTS 2,827,447    Nowlin et al. _____ Mar. 18, 1958

OTHER REFERENCES

Bawn et al.: "Discussions Faraday Soc.," 1947, No. 2, pages 228–236.

Noller: Textbook of Organic Chemistry (1951), Saunders Co., Philadelphia, page 111.